United States Patent

Sakai et al.

[11] Patent Number: 5,991,110
[45] Date of Patent: Nov. 23, 1999

[54] THIN FILM MAGNETIC HEAD AND MAGNETIC RECORDING AND REPRODUCING APPARATUS

[75] Inventors: Masanori Sakai; Makoto Yoshida; Kazumasa Fukuda; Mikio Matsuzaki, all of Tokyo, Japan

[73] Assignee: TDK Corporation, Tokyo, Japan

[21] Appl. No.: 09/159,562

[22] Filed: Sep. 24, 1998

Related U.S. Application Data

[62] Division of application No. 08/774,317, Dec. 24, 1996, Pat. No. 5,844,749, which is a continuation of application No. 08/300,559, Sep. 6, 1994, abandoned.

[30] Foreign Application Priority Data

Jan. 25, 1994 [JP] Japan ............................... 6-6676
Jun. 29, 1994 [JP] Japan ............................. 6-148380

[51] Int. Cl.⁶ .................. G11B 5/035; G11B 5/187; G11B 5/31
[52] U.S. Cl. ..................... 360/65; 360/119; 360/122
[58] Field of Search ................... 360/65, 75, 103, 360/126, 119, 122

[56] References Cited

U.S. PATENT DOCUMENTS

| | | | |
|---|---|---|---|
| 5,079,831 | 1/1992 | Reid | 360/113 |
| 5,157,569 | 10/1992 | Kumasaka et al. | 360/126 |
| 5,305,166 | 4/1994 | Inoue et al. | 360/103 |
| 5,331,494 | 7/1994 | Fukuda et al. | 360/103 |
| 5,406,434 | 4/1995 | Amin et al. | 360/126 |
| 5,452,166 | 9/1995 | Aylwin et al. | 360/126 |

FOREIGN PATENT DOCUMENTS

| | | |
|---|---|---|
| 452846 | 10/1991 | European Pat. Off. |
| 62-217416 | 9/1987 | Japan . |
| 3-263603 | 11/1991 | Japan . |
| 3-296907 | 12/1991 | Japan . |
| 4-322754 | 6/1992 | Japan . |
| 4-324860 | 11/1992 | Japan . |
| 5-266429 | 10/1993 | Japan . |
| 5-108878 | 12/1993 | Japan . |
| 6-150278 | 5/1994 | Japan . |

*Primary Examiner*—David L. Ometz
*Attorney, Agent, or Firm*—Oblon, Spivak, McClelland, Maier & Neustadt, P.C.

[57] ABSTRACT

In the thin film magnetic transducer element, the front end portions of the upper pole piece and the lower pole piece are partially removed in such a manner that they align non parallel to the gap film on the opposite sides of the gap film. The condition $\Delta P1 > \Delta P2$ is satisfied when the difference between the maximum pole length P1max and the minimum pole length P1min of the lower pole piece is $\Delta P1$ and the difference between the maximum pole length P2max and the minimum pole length P2min of the upper pole piece is $\Delta P2$. The sub pulse is reduced and so the partial response method can be employed.

20 Claims, 12 Drawing Sheets

THIN FILM MAGNETIC HEAD AND MAGNETIC RECORDING AND REPRODUCING APPARATUS

This application is Division of application Ser. No. 08/774,317, filed on Dec. 24, 1996, now U.S. Pat. No. 5,844,749, which is a Continuation of application Ser. No. 08/300,559, filed on Sep. 6, 1994, now abandoned.

BACKGROUND OF THE INVENTION

1. Field of the Invention

The present invention relates to a thin film magnetic head and magnetic recording and reproducing apparatus.

2. Discussion of Background

A thin film magnetic head in the prior art is disclosed in, for example, U.S. Pat. No. 4,856,181. Its basic structure includes rail portions provided at intervals on the surface of the slider, constituted by a ceramic structure, that faces opposite the medium. The surfaces of the rail portions are air-bearing surfaces with a high degree of flatness. At the end of each rail portion in the direction of air flow, a thin film magnetic transducer element is mounted. The thin film magnetic transducer element is a thin film element formed by a process similar to that of IC manufacturing technology and it is formed by integrating a lower magnetic film, a gap film, an upper magnetic film, a coil film, an insulating film, a protective film and the like. The lower magnetic film and the upper magnetic film have a lower pole piece and an upper pole piece respectively that face opposite each other across the gap film at their front end surfaces. The structure of these pole pieces and the gap film constitutes a transducing gap.

Such a thin film magnetic head is mainly used in a magnetic recording and reproducing apparatus that is used in storage system for computers and the binary data to be handled are modulated in correspondence with magnetized and non magnetized regions, or the direction of magnetization of the medium. Typical methods of modulation include the peak detection method and the PRML (partial response maximum likelihood) method which combines the regenerated waveform equalization processing based upon the partial response method, and the signal decoding system based upon the Viterbi decoding algorithm. Of these, PRML has been attracting much attention as a signal processing method that can support high-density recording and is disclosed in U.S. Pat. No. 4,571,734, U S. Pat. No. 4,644,564 and U.S. Pat. No. 4,707,681.

Since the thickness of the tips at the end surfaces of the pole pieces of a thin film magnetic head is approximately consistent at the thickness of the magnetic film which is formed during the manufacturing process, a sub pulse, attributable to a pseudo gap, is generated at the position that corresponds to the end edge of the pole piece. This sub pulse is characteristically manifested in a thin film magnetic head in which the pole pieces are very thin. If a sub pulse occurs, it interferes with the main pulse, changing the main pulse. When a sub pulse interferes with and changes the main pulse, it becomes difficult to use the PRML method.

The concept for inhibiting this sub pulse is disclosed in Japanese Examined Patent Publication No. 29090/1978, Japanese Unexamined Patent Publication No. 287411/1987, Japanese Unexamined Patent Publication No. 91812/1988 and Japanese Unexamined Patent Publication No. 103410/1988. In Japanese Examined Patent Publication No. 29090/1978, a method is disclosed wherein after forming the upper magnetic film or the lower magnetic film, a third magnetic film is sputtered on at least one of these magnetic films. It is then etched to ensure that the entirety of the magnetic films will not lie parallel to the gap film. Japanese Unexamined Patent Publication No. 287411/1987 discloses a method whereby the entirety of both the upper magnetic film and the lower magnetic film are formed in such a way that their edges will lie non parallel to each other. Japanese Unexamined Patent Publication No. 91812/1988 discloses a method whereby the effect of the pseudo gap is reduced by lowering the magnetic permeability $\mu$ on the outside of the pole pieces.

In another facet of the prior art, Japanese Unexamined Patent Publication No. 13210/1992 discloses a method whereby the sub pulse is suppressed by changing the thickness of at least one of the pole pieces in such a manner that the surface on the opposite side of the gap film will form a curved surface. Then, in Japanese Unexamined Patent Publication No. 146510/1992, a method is disclosed whereby the sub pulse is suppressed with stages provided on the opposite side of the gap film in the pole pieces. Japanese Unexamined Patent Publication No. 163707/1992 and Japanese Unexamined Patent Publication No. 163708/1992 disclose a method whereby the sub pulse is suppressed by structuring the pole pieces with a plurality of layers of magnetic film integrated with one another to control the saturation magnetic flux density of the magnetic films.

Additionally, Japanese Unexamined Patent Publication No. 263603/1991 discloses a method whereby the contour effect is suppressed by forming the core end in a shape that is unparallel with the gap. The publication details that the contour effect can be even more effectively reduced if the shape of the core end is set in such a manner that the difference $\Delta P$ between the maximum pole length Pmax and the minimum pole length Pmin of the core end will fall within the, range of approximately ⅓ to 2 times the recording wavelength.

However, with the prior art technology described above, it has not yet been possible to suppress the sub pulse to such an extent that PRML can be adopted. Although the technology disclosed in Japanese Unexamined Patent Publication No. 263603/1991 is effective in reducing the sub pulse, the publication does not disclose a means for reducing the sub pulses that are generated at the lower pole piece and the upper pole piece to a similar degree so that they will be well balanced. Because of this, even when the sub pulse generated at the upper pole piece has been flattened to the extent whereby the partial response method could be adopted, the sub pulse at the lower pole piece is not reduced as much as the one at the upper pole piece. Therefore, adoption of PRML is still quite difficult.

SUMMARY OF THE INVENTION

It is an object of the present invention to provide a thin film magnetic head with an induction type magnetic transducer element suitable for high-density recording.

It is a further object of the present invention to provide a thin film magnetic head for which such means for machining as combined use of mask and milling, chemical etching and the like are possible, and which is suitable for industrial mass production.

It is a still further object of the present invention to provide a thin film magnetic head and a magnetic recording and reproducing apparatus in which the effect of the sub pulse on the main pulse is insignificant and in which it is possible, therefore, to obtain an output waveform similar to the Lorentz pulse so that PRML can be adopted effectively.

It is a still further object of the present invention to provide a thin film magnetic head and a magnetic recording and reproducing apparatus in which the degree of change that the sub pulse manifests over time can be limited to such an extent that PRML can be reliably adopted.

It is a still further object of the present invention to provide a thin film magnetic head and a magnetic recording and reproducing apparatus which balances the sub pulses at the lower pole piece and the upper pole piece so that PRML can be reliably adopted.

It is a still further object of the present invention to provide a thin film magnetic head with a pole width that supports high-density recording.

It is a still further object of the present invention to provide a thin film magnetic head in which the write width is sufficiently reduced to allow high-density recording.

It is a still further object of the present invention to provide a thin film magnetic head in which the width of the pole pieces can be set at a specific value even when there is a patterning error in the photolithography.

In order to achieve the above described objects, the thin film magnetic head according to the present invention is provided with a slider and a thin film magnetic transducer element. The slider has an air bearing surface on the side that faces opposite the medium. The thin film magnetic transducer element is provided with a thin film magnetic circuit that includes a lower magnetic film, an upper magnetic film and a coil film and is positioned on the slider. The lower magnetic film and the upper magnetic film have a lower pole piece and an upper pole piece respectively that face opposite each other across the gap film, and the front end surface of the lower pole piece and the upper pole piece emerge on the aforementioned air bearing surfaces. The lower pole piece and the upper pole piece are each adjacent to separate depressed areas and these depressed areas are formed by partially removing the aforementioned front end surfaces on opposite sides of the gap film in such a manner that the edges that are created at the boundary with the front end surfaces will be non parallel with the gap film. In this structure, when the maximum pole length and the minimum pole length of the front end surface of the aforementioned lower pole piece are P1max and P1min respectively, and the difference between the maximum pole length P1max and the minimum pole length P1min is $\Delta$P1, and when the maximum pole length and the minimum pole length of the front end surface of the aforementioned upper pole piece are P2max and P2min respectively, and the difference between the maximum pole length P2max and the minimum pole length P2min is $\Delta$P2, $\Delta$P1>$\Delta$P2 is satisfied The thin film magnetic head described above preferably has both sides in the direction of the track width removed. It should be set so that in the structure as described above, when the depth d2 of the depressed areas which are created by the removal is1 $\mu$m or more, the ratio (W0/W2) of the width of the upper pole piece in the direction of the track width before the removal W2, and the width in the direction of the track width after removal W0, is 0.8 or more, when the depth d2 of the depressed areas is 2 $\mu$m or more, the ratio (W0/W2) is 0.6 or more and when the depth d2 of the depressed areas is 4 $\mu$m or more, the ratio (W0/W2) is 0.5 or more.

With the slider having an air bearing surface on the side facing opposite the medium, the thin film magnetic transducer element, which is located on the slider, is provided with a thin film magnetic circuit that includes a lower magnetic film, an upper magnetic film and a coil film, with the lower magnetic film and the upper magnetic film having a lower pole piece and an upper pole piece respectively that face opposite each other across the gap film and with the front end surfaces of the lower pole piece and the upper pole piece emerging on the air bearing surface, a thin film head with an induction type magnetic transducer element is realized.

As only a portion of the front end surfaces of the pole pieces is removed and the greater part of them excluding the removed areas retains the original thickness of the pole pieces, a write capability is assured and because of this, the overwrite characteristics are not sacrificed.

Since the edges that are created at the boundary between the depressed areas and the front end surfaces run non parallel to the gap film, the thickness of the front end surfaces of the pole pieces becomes gradually reduced in conformance with the inclination of the end edges that are non parallel to the gap film. This is equivalent to gradually reducing the magnetic characteristics of the pole pieces in the direction in which the magnetic recording medium runs and eliminating the pseudo gap. Because of this, the sub pulse becomes diffused on the time axis and the output waveform takes a shape that is close to the Lorentz pulse. This makes it possible to adopt the PRML method that combines the reproduced waveform equalizing processing based upon the partial response method, and signal decoding processing with the Viterbi decoding algorithm. Also, when $\Delta$P1>$\Delta$P2 is satisfied as has been described earlier, control is performed in the direction in which the sub pulse generated at the lower pole piece becomes equal to the sub pulse generated at the upper pole piece. This further facilitates the adoption of PRML.

The signal processing circuit that constitutes the magnetic recording and reproducing apparatus according to the present invention performs reproduced waveform equalizing processing by employing the partial response method as a means for recording encoding. In the partial response method employed in the present invention, the 8–9 conversion code as well as the (1, 7) code which is used in existing magnetic recording and reproducing apparatuses can be used. The 8–9 conversion code is used in combination with PR4.

The signal processing circuit that constitutes the magnetic recording and reproducing apparatus according to the present invention performs decoding processing using the Viterbi decoding algorithm along with reproduced waveform equalizing based upon the partial response method described above. Therefore, the signal processing circuit that constitutes the magnetic recording and reproducing apparatus according to the present invention adopts the PRML method.

Since the end edges of the pole pieces are made non parallel by the removal process, it can be easily accomplished by such processing means as combined use of mask and milling or chemical etching. This provides a straightforward industrial manufacturing process.

In an example in which both sides of the lower pole piece P1 and the upper pole piece P2 are removed in the direction of the width, the pole piece width W0 can be adjusted in conformance with the position of removal at both sides in the direction of the width to easily realize, for instance, the narrowing required to support high-density recording.

Also, when there is a patterning error in the photolithography, the pole piece width can still be set at a specific value with the selection and adjustment of the location of the removal on both sides in the direction of the width to improve the yield. Even if the required pole piece widths are different, patterning can be performed using a single mask and then the pole piece widths can be set at specific values by adjusting the position and width of the removal. This eliminates the necessity for providing masks to correspond to the widths of various pole pieces. Thus, one mask will suffice to form the pole pieces, reducing the cost of production and, at the same time, improving the yield.

The removal at the sides of the lower pole piece and the upper pole piece in the direction of the width directly affects the write width due to the leakage flux, which is closely related to the depth d2 of the depressed areas created by the removal and the ratio (W0/W2) of the width W2 before removal at the upper pole piece in the direction of the track width to the width W0 after the removal in the direction of the track width. When the depth d2 of the depressed areas created by the removal is 1 μm or more, if the ratio (W0/W2) is 0.8 or more, the write width due to the leakage flux can be reduced compared to the prior art. The write width, due to the leakage flux, can be reduced compared to the prior art by setting the ratio (W0/W2) at 0.6 or more when the depth d2 of the depressed areas is 2 μm or more and by setting the ratio (W0/W2) at 0.5 or more when the depth d2 of the depressed areas is 4 μm or more.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings wherein.

DETAILED DESCRIPTION OF THE PREFERRED EMBODIMENTS

Figure 1:
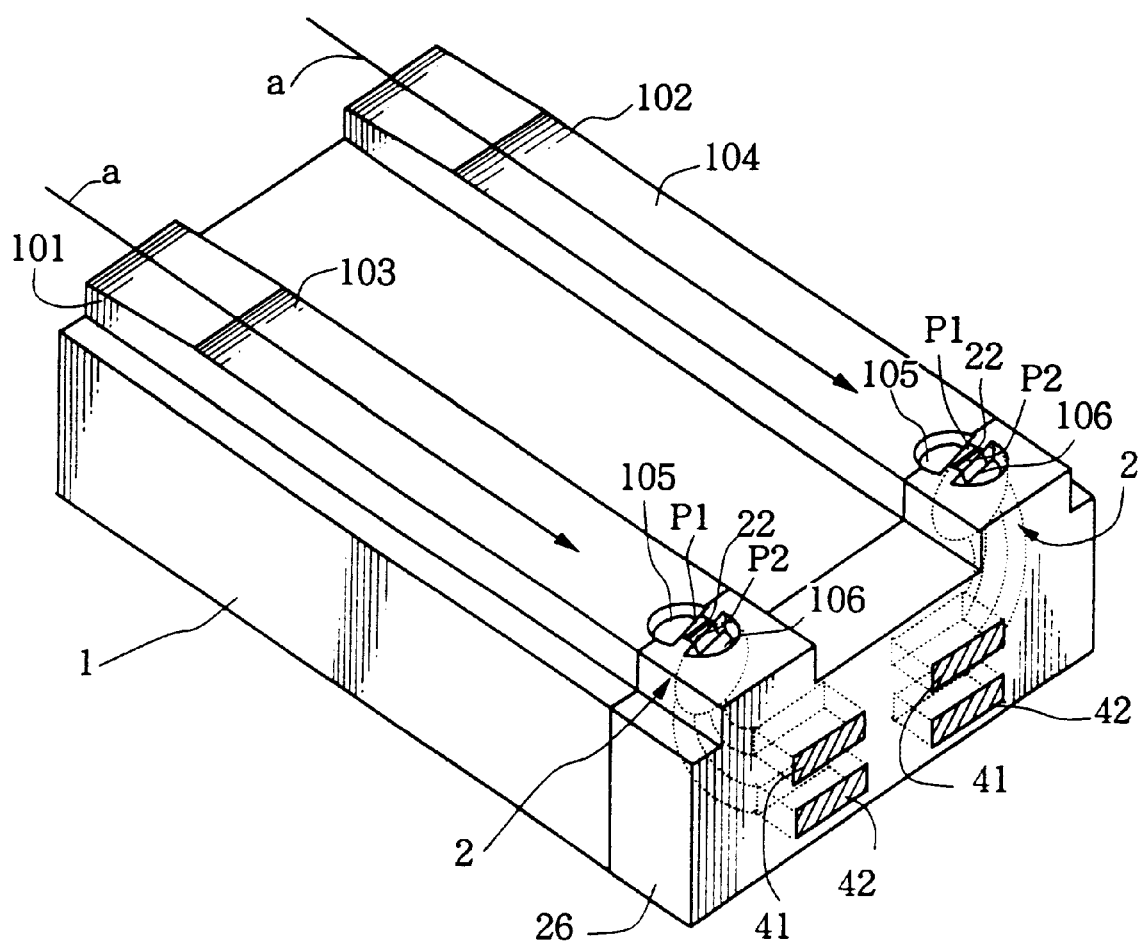
FIG. 1 is a perspective view of the thin film magnetic head according to the present invention.
Figure 2:
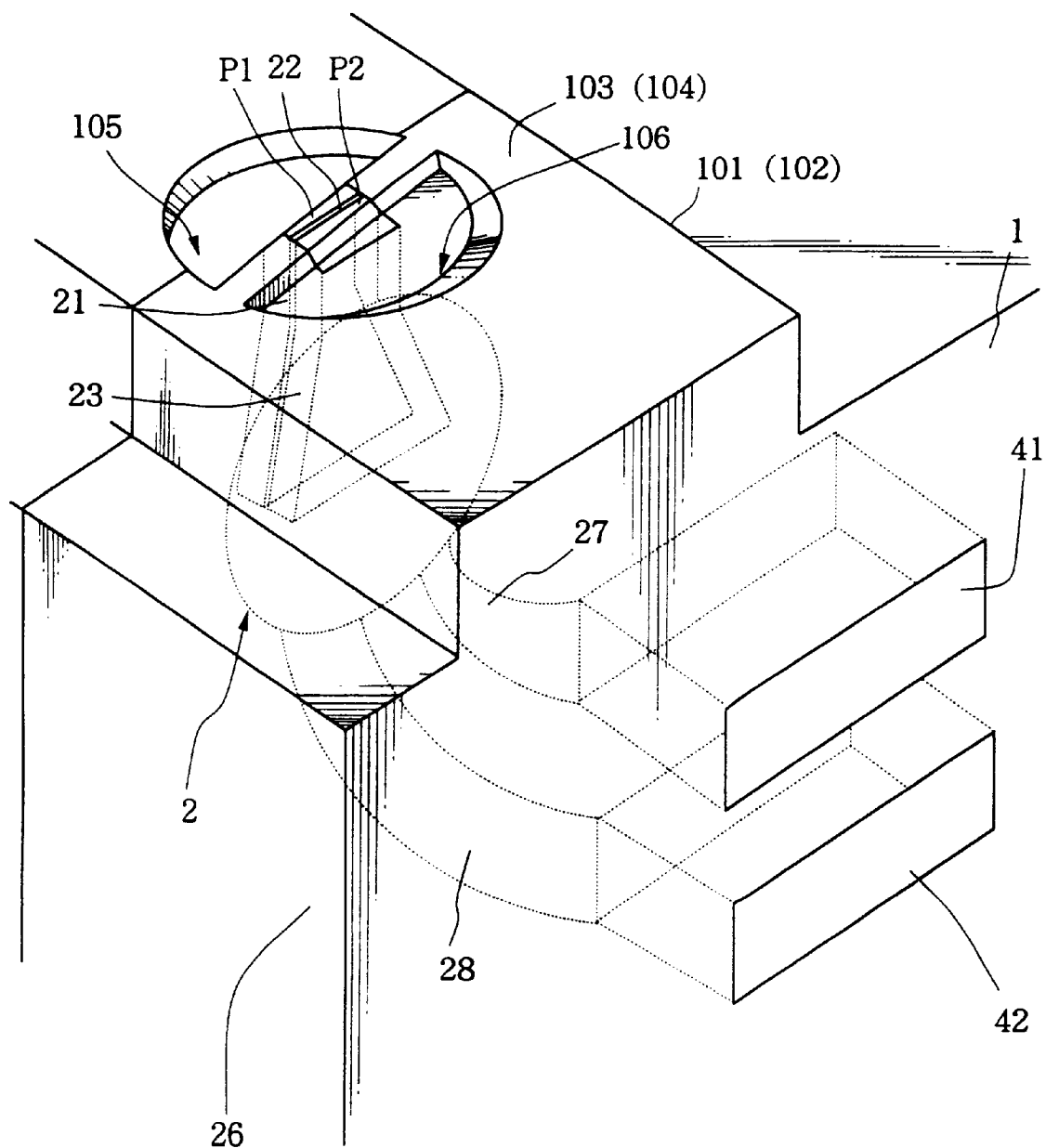
FIG. 2 is an enlarged perspective view of the magnetic transducer element included in the thin film magnetic head shown in FIG. 1.
Figure 3:
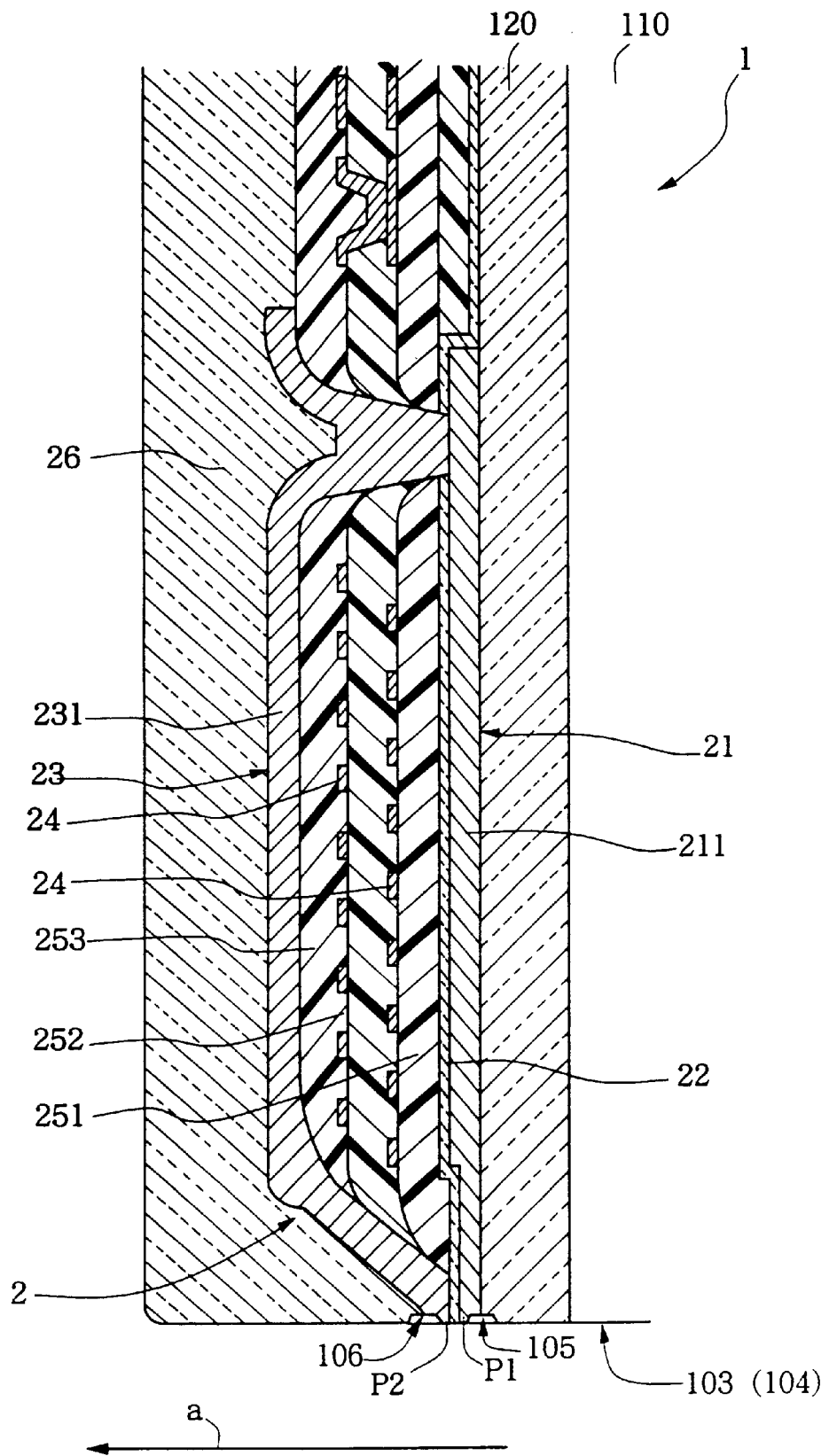
FIG. 3 is an enlarged cross-sectional view of the magnetic transducer element included in the thin film magnetic head shown in FIG. 1.

As shown in FIGS. 1 to 4, the thin film magnetic head according to the present invention includes a slider 1 and thin film magnetic transducer elements 2. The slider 1 is provided with rail portions 101 and 102 on the side that faces opposite the medium. The surfaces of the rail portions 101 and 102 constitute air bearing surfaces 103 and 104 respectively. The number of the rail portions 101 and 102 does not have to be two. It may be either one or it may be three or more.

The thin film magnetic transducer element 2 is provided with a thin film magnetic circuit that includes a lower magnetic film 21, an upper magnetic film 23 and a coil film 24 and is located at the trailing end of one or both of the rail portions 101 and 102 in the direction of the air outflow indicated as arrows a. The structure of the thin film magnetic transducer element 2 is shown in detail in FIG. 3. In the figure, the slider 1 has a structure in which an insulating film 120 that is formed of $Al_2O_3$ or the like is bonded to the base body portion 110 constituted by $Al_2O_3$—TiC or the like, by such means as sputtering. The thin film magnetic transducer element 2 is provided on the insulating film 120. The thin film magnetic transducer element 2 is a thin film element that is prepared through a process similar to that in IC production technology and the thin film element includes the lower magnetic film 21, which is formed of Permalloy or the like, the upper magnetic film 23 that is formed of Permalloy or the like, the coil film 24, the gap film 22 formed of $Al_2O_3$ or the like, the insulating films 251 to 253 formed of photoresist or the like, the protective film 26 formed of $Al_2O_3$ or the like and the lead conductors 27 and 28.

The lower magnetic film 21 and the upper magnetic film 23 are provided with the lower pole piece P1 and the upper pole piece P2 respectively that face opposite each other across the gap film 22 at their front end surfaces. The front end surfaces of the lower pole piece P1 and the upper pole piece P2 emerge on the air bearing surfaces 103 and 104. The lower magnetic film 21 and the upper magnetic film 23 are provided with the continuous yolk portions 211 and 231 respectively that lie behind the lower pole piece P1 and the upper pole piece P2. The yolk portions 211 and 231 are joined with each other in such a manner that they will complete the magnetic circuit at the joined area in the rear. The coil film 24 is formed in such a manner that it coils around the joined area in a coil-like manner. The two ends of the coil film 24 are connected to the lead conductors 27 and 28. The lead conductors 27 and 28 are lead out to the area where electrodes 41 and 42 are formed, and are provided with electrodes 41 and 42 at their ends. The protective film 26 that protects the entirety of the thin film magnetic transducer element 2 surrounds and covers the electrodes 41 and 42.

Figure 4:
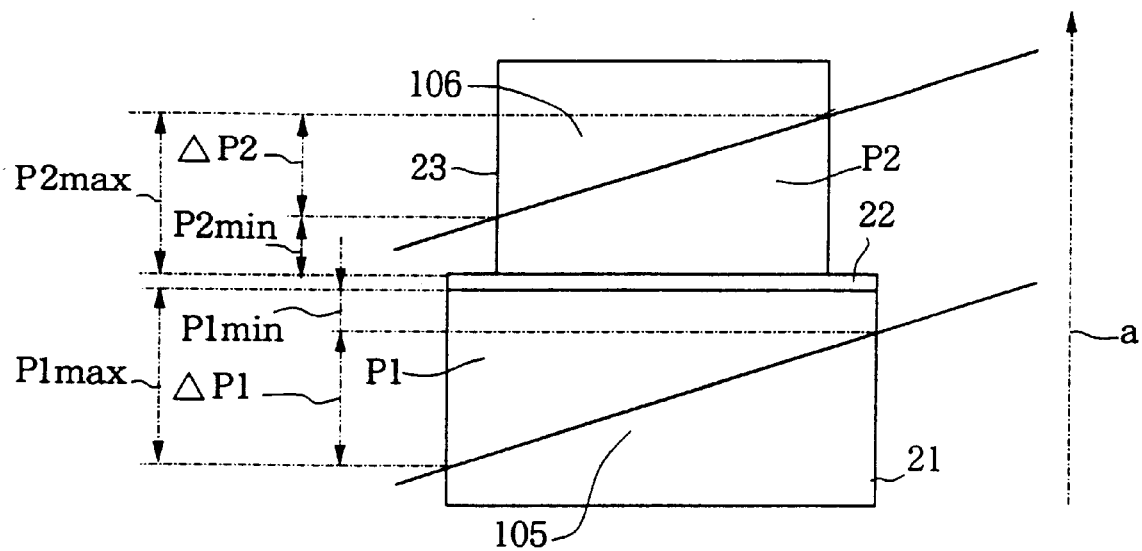
FIG. 4 is a plan view of the thin film magnetic head shown in FIG. 1, seen from the side facing opposite the medium.

FIG. 4 shows that the lower pole piece P1 is provided with the depressed area 105 and that the depressed area 105 is formed by partially removing the pole front end surface on the opposite side from the gap film 22. The end edge of the depressed area 105 that constitutes its boundary with the front end surface of the pole piece is non parallel with the gap film 22. Likewise, the upper pole piece P2 is provided with the depressed area 106 and that the depressed area 106 is formed by partially removing the pole front end surface on the opposite side from the gap film 22. The end edge of the depressed area 106 that constitutes its boundary with the front end surface of the pole piece is non parallel with the gap film 22. The depressed areas 105 and 106 described above can be formed by combined use of mask and milling or chemical etching. The depressed areas 105 and 106 may also be filled with an appropriate non magnetic filler such as ceramic.

Next, $\Delta P1 > \Delta P2$ is satisfied when the maximum pole length and the minimum pole length of the front end surface of the aforementioned lower pole piece are P1max and P1min respectively, and the difference between the maximum pole length P1max and the minimum pole length P1min is $\Delta P1$, and when the maximum pole length and the minimum pole length of the front end surface of the aforementioned upper pole piece are P2max and P2min respectively, and the difference between the maximum pole length P2max and the minimum pole length P2min is $\Delta P2$. The difference $\Delta P1$ is preferably 1.5 times the difference $\Delta P2$. The difference $\Delta P1$ and the difference $\Delta P2$ should be set at double or more than the shortest magnetizing inversion wavelength when the (1, 7) code modulation method is used as the method for read/write modulation and they should be set at 4 times or more than the shortest magnetizing inversion wavelength when the 8–9 conversion code is used.

Figure 5:
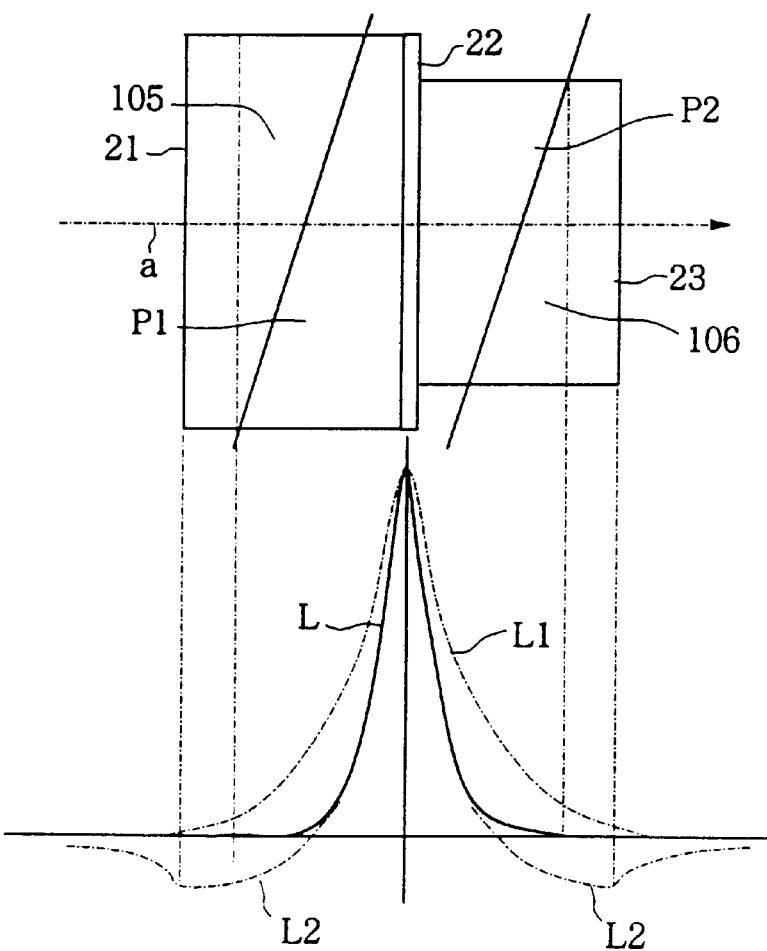
FIG. 5 illustrates the function of the thin film magnetic head according to the present invention.

FIG. 5 shows the relationship between the shape of the pole pieces and the output waveform of the thin film magnetic head according to the present invention. As has been explained earlier, since the end edges of the pole pieces P1 and P2 on the opposite sides from the gap film 22 run non parallel with the gap film 22, the thickness of the pole pieces P1 and P2 at its front end is gradually reduced in conformance with the inclination of the end edge which is non parallel with the gap film 22. This structure is equivalent to gradually reducing the magnetic characteristics of the pole piece P1 or P2 in the direction a of the running of the magnetic recording medium and eliminating the pseudo gap. Because of this, the sub pulse becomes diffused on the time axis and the output waveform becomes the waveform L, which is similar to the Lorentz pulse and does not include any significant sub pulse as shown by the curved line L in FIG. 5. With this, a thin film magnetic head in which it is possible to adopt PRML is obtained.

Unlike what is shown in FIGS. 1 to 5, if the end edge of at least one of the pole pieces P1 and P2 on the opposite side from the gap film 22 is formed in such a manner that it runs parallel to the gap film 22, the end edge of the pole piece P1 or P2 that is located on the air-bearing surface 103 or 104 becomes a negative edge. This negative edge will generate the sub pulse L2 as indicated by the dotted lines in FIG. 5. The sub pulse L2 will be buried in the main pulse L1 caused by the sharpening of the reproduced waveform due to the reduction in the thickness of the front edge of the pole piece P1 or P2 and will not be observed on the reproduced waveform. However, it will be included in the reproduced waveform as a frequency element and with the sub pulse subsumed in the main pulse, level fluctuations in the main pulse will occur. Because of this, it will be difficult to employ PRML suitable for high-density recording.

Furthermore, since the relationship between the difference $\Delta P1$ between the maximum pole length P1max and the minimum pole length P1min of the lower pole piece P1, and the difference $\Delta P2$ between the maximum pole length P2max and the minimum pole length P2min of the upper pole piece P2 satisfies $\Delta P1 > \Delta P2$, control is performed such that the sub pulse generated at the lower pole piece P1 and the sub pulse generated at the upper pole piece P2 are balanced. This facilitates reliable employment of PRML. This point is explained in further detail with reference to FIG. 6.

Figure 6:
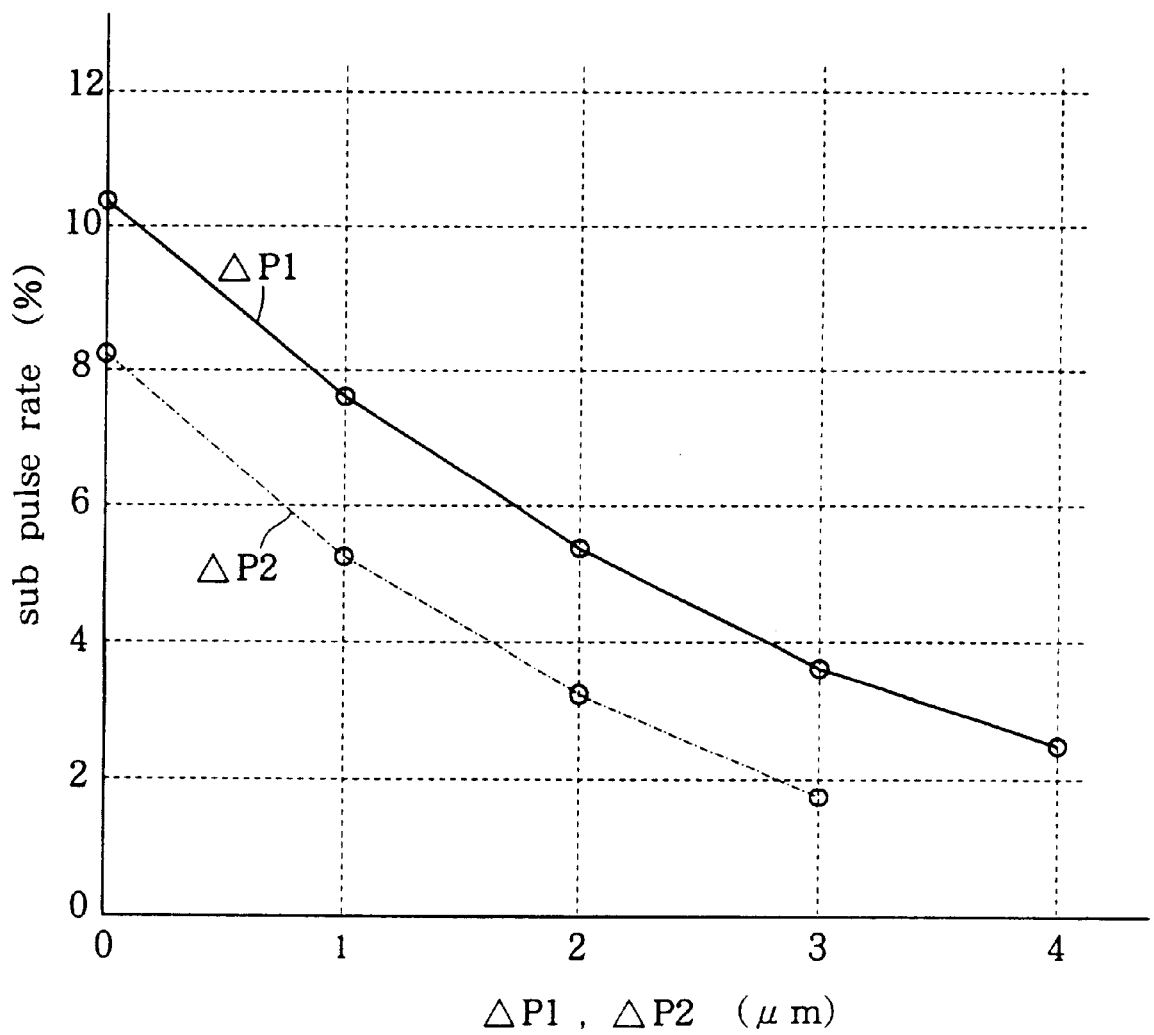
FIG. 6 illustrates a graph of data showing the relationship between the sub pulse rate and the values of the differences ΔP1 and ΔP2 (μm) of the thin film magnetic head according to the present invention.

In FIG. 6, the values of the differences $\Delta P1$ and $\Delta P2$ ($\mu$m) are plotted on the horizontal axis against the sub pulse rate (%) on the vertical axis. The sub pulse rate (%) refers to the ratio of the peak value of the sub pulse to the peak value of the main pulse. As shown in FIG. 6, when the difference $\Delta P1$ and the difference $\Delta P2$ are the same value, the sub pulse generated at the lower pole piece P1 is larger than the sub pulse generated at the upper pole piece P2. Because of this, if the difference P1 and the difference P2 are set at approximately equal values, the adoption of PRML is difficult, since the value of the sub pulse generated at the lower pole piece P1 is large even if the sub pulse generated at the upper pole piece P2 is reduced to a value that would make it possible to adopt the partial response method. One of the reasons that it is difficult to employ the partial response method in the invention disclosed in Japanese Unexamined Patent Publication No. 263603/1991, even though the invention does have a sub pulse reducing effect, is that this prior art technology does not take into consideration the correlation between the difference $\Delta P1$ and the difference $\Delta P2$.

Next, when we take a further look at the data presented in FIG. 6, it is obvious that the sub pulse becomes smaller as the difference $\Delta P1$ and the difference $\Delta P2$ become larger. With this characteristic of the sub pulse in relation to the difference $\Delta P1$ and the difference $\Delta P2$, and also the other characteristic that the sub pulse generated at the lower pole piece P1 is larger than the sub pulse generated at the upper pole piece P2, if the difference $\Delta P1$ and the difference $\Delta P2$ are the same value, it is easily understood that by setting the difference $\Delta P1$ that is selected for the lower pole piece P1 larger than the difference $\Delta P2$ selected for the upper pole piece P2, that is, by satisfying $\Delta P1 > \Delta P2$, the value of the sub pulse generated at the lower pole piece P1 becomes lowered, approaching the value of the sub pulse generated at the upper pole piece P2. This makes it possible to adopt the partial response method and PRML. According to the data shown in FIG. 6, when the difference $\Delta P1$ is greater than the difference $\Delta P2$ by approximately 1 $\mu$m, the sub pulse generated at the lower pole piece P1 and the sub pulse generated at the upper pole piece P2 become approximately equal and are in balance.

In the present invention, the end edges of the pole pieces P1 and P2 are made non parallel by removal, which can be easily accomplished by such processing means as combined use of mask and milling or chemical etching. This provides a straightforward industrial manufacturing process.

Also, since the front end surfaces of the pole pieces P1 and P2 are only partially removed, and the greater part of them excluding the removed areas retains the original thickness of the pole pieces of approximately 3 to 5 μm, and since the depth of the removal is to a degree that assures write capability, the overwrite characteristics are not sacrificed.

Figure 7:
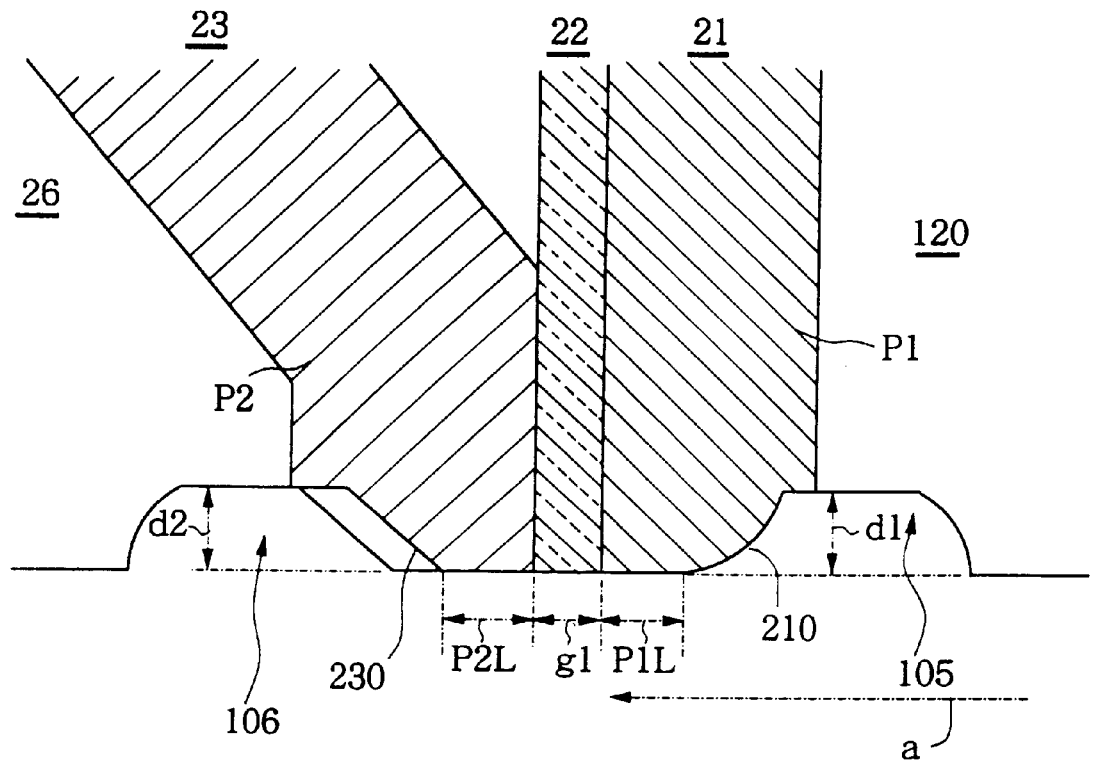
FIG. 7 is an enlarged view of the pole pieces of the thin film magnetic head shown in FIGS. 1 to 3.
Figure 8:
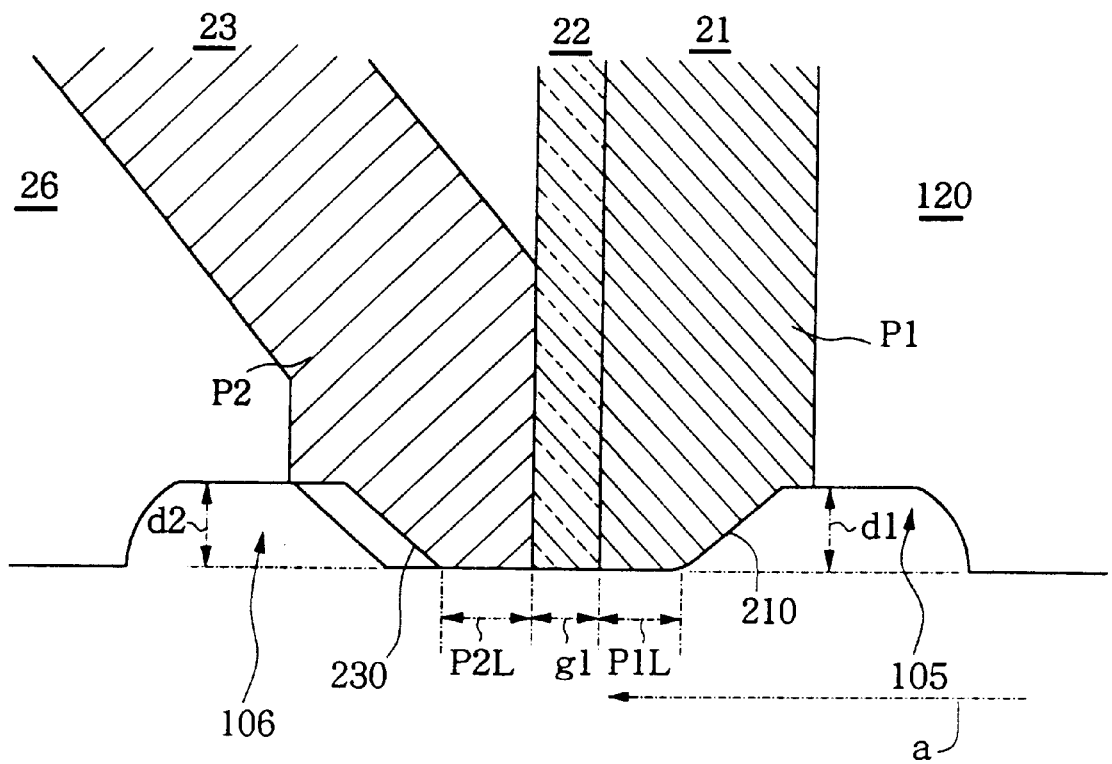
FIG. 8 is an enlarged view of the pole pieces of the thin film magnetic head in another embodiment according to the present invention.

Next, FIGS. 7 and 8 show that the depressed areas 105 and 106 respectively have the inclined surfaces 210 and 230 that incline from the air-bearing surfaces 103 and 104. It is desirable to set the angle of inclination for the inclined surfaces 210 and 230 at 60° or less with the pole front end surfaces that constitute the airbearing surfaces 103 and 104 as a reference.

Of the depressed areas 105 and 106, it is desirable to structure the depressed area 105 that is provided at the lower pole piece P1 in such a manner that the front end surface, that constitutes the air-bearing surfaces 103 and 104, and the inclined surface 210 that drops down from the front end surface, lie continuous to each other without generating a substantial edge portion. A typical example of such a surface is shown in FIG. 7 in which the inclined surface 210 is formed as a curved surface that is contiguous with the front end surface. Or as shown in FIG. 8, the inclined surface 210 may be formed as a flat surface with a mild inclination and it may be made to join the front end surface without generating any level difference that would otherwise become a substantial edge between itself and the front end surface.

When partially removing at least one of the pole pieces P1 and P2 on the opposite side from the direction where the gap film 22 is present, if it is removed in such a manner that it forms a step-like stage with the pole end edge angle at approximately 90°, the end edge of the pole piece P1 or P2 on the air-bearing surface 103 or 104, becomes a negative edge and this will contain a latent possibility for generating a sub pulse.

In contrast, if the front end surface is removed in such a manner that the inclined surfaces 210 and 230 drop down from the airbearing surfaces 103 and 104 at an angle of inclination of less than 90°, the negative edge effect is reduced, making the sub pulse very small.

Especially if the front end surface that constitutes the air-bearing surfaces 103 and 104 at the lower pole piece P1 side and the inclined surface 210 that drops down from the front end surface lie continuous without generating a substantial edge, the amplitude of the sub pulse becomes reduced due to the combined effect of this and of the non parallel edges and the output waveform becomes an ideal waveform, similar to the Lorentz pulse. This achieves a thin film magnetic head that is even more suitable for the adoption of PRML. The inclined surface 230 of the upper pole piece P2 can take a stricture that is identical to that of the inclined surface 210 of the lower pole piece P2.

The quantities of recession d1 and d2 of the depressed areas 105 and 106 due to removal should be set within the range of 0.05 μm to 5, μm. If the quantities of recession d1 and d2 exceed 5 μm, the overwrite characteristics will deteriorate and if they are less than 0.05 μm, the structure of the present invention will not function realistically.

Figure 9:
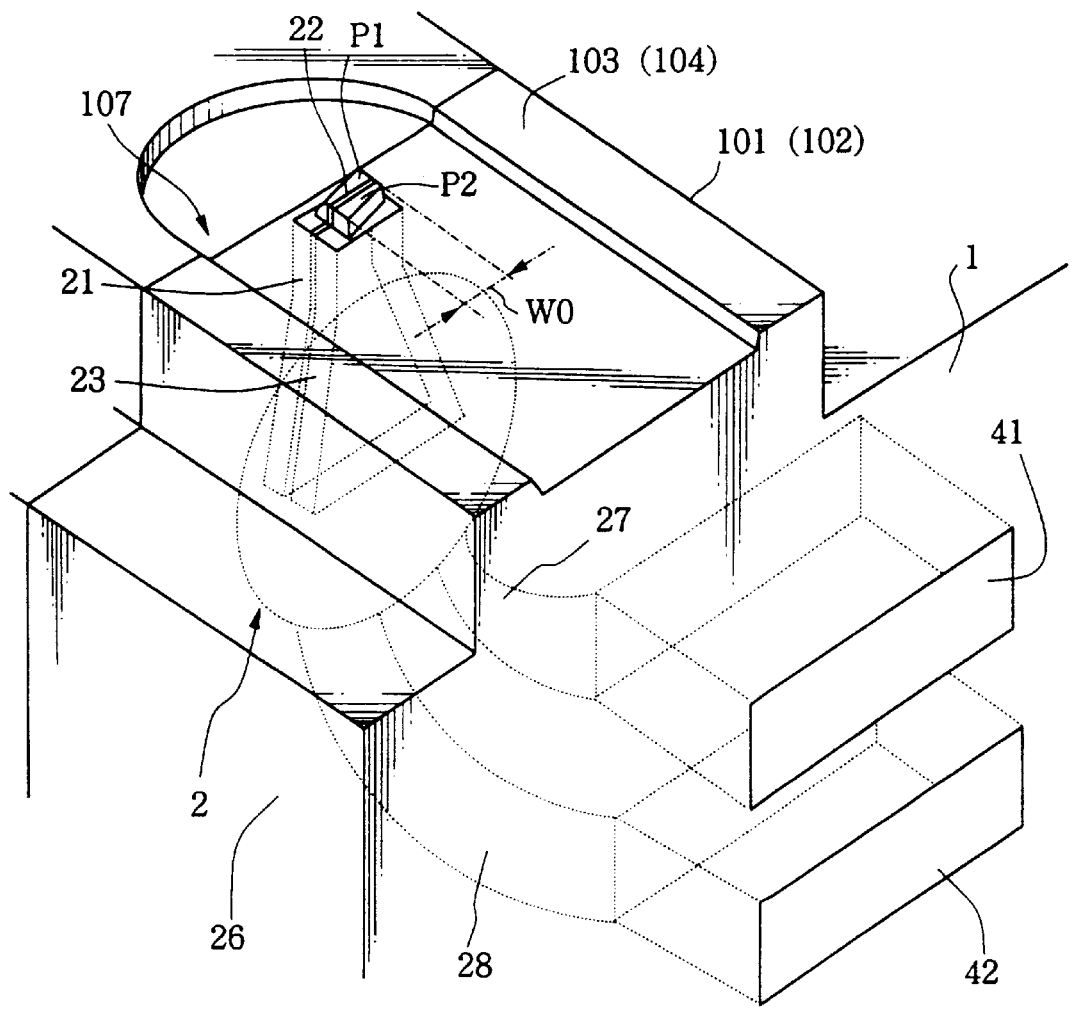
FIG. 9 is an enlarged perspective view of the magnetic transducer element in another embodiment of the thin film magnetic head in according to the present invention.

FIG. 9 shows yet another embodiment of the thin film magnetic head according to the present invention. In this embodiment, the depressed area 107 is provided around the lower pole piece P1 and the upper pole piece P2. The area on the opposite side from the direction in which the gap film 22 is present is partially removed in such a manner that its edges will run non parallel to the gap film 22 and both ends in the direction of the width are partially removed, too. The pole piece width W0 of the lower pole piece P1 and the upper pole piece P2 is determined with the positions of the removals at the two ends in the direction of the width.

As explained above, since both sides of the lower pole piece P1 and the upper pole piece P2 are partially removed at the two ends in the direction of the width, the pole piece width W0 can be adjusted in conformance with the position of the removal at both ends in the direction of the width to easily realize the narrowing and the like required to support high-density recording.

Also, even when there is a patterning error in the photolithography, the pole piece width W0 can be set at a specific value with the selection and adjustment of the position of the removal at both ends in the direction of the width to improve the yield. Furthermore, even when the required pole piece widths W0 are different, patterning can be performed by using a single mask and then the pole piece widths W0 can be set at specific values by adjusting the position and width of the removal. This eliminates the necessity for providing multiple masks to correspond to the widths of various pole pieces. One mask will suffice to form the pole pieces, reducing the cost of production and, at the same time, improving the yield.

Figure 10:
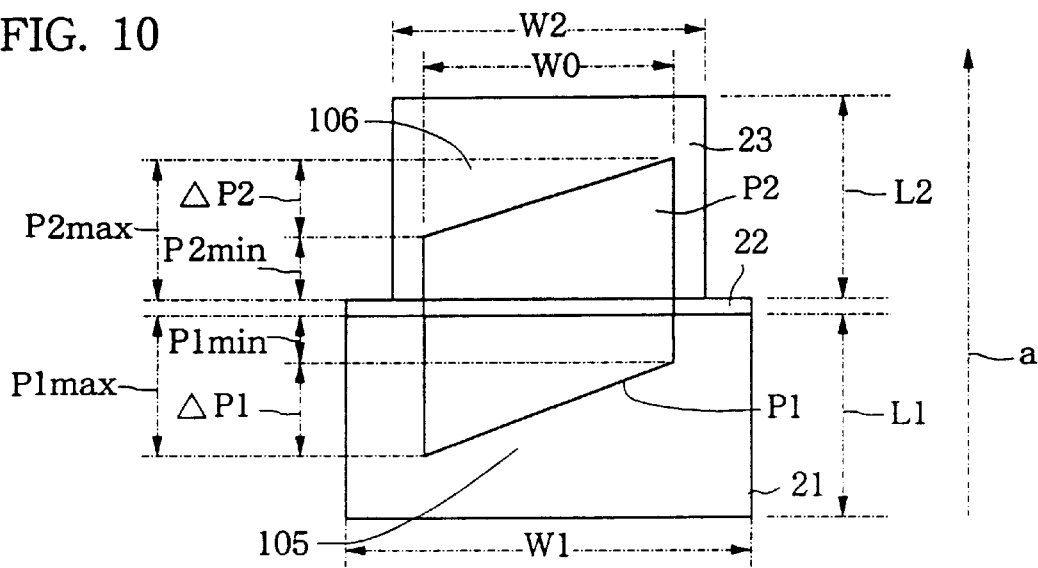
FIG. 10 shows a specific example of dimensions when the present invention takes a structure as shown in FIG. 9.

FIG. 10 shows an example of the pole pieces of the thin film magnetic head shown in FIG. 9 with specific dimensions. The lower magnetic film 21 has a width W1 in the direction of the track width of 7.5 μm and a thickness (length) T1 of 6.0 μm. The gap film has a thickness of 0.3 μm. The upper magnetic film 23 has a width W2 of 6.0 μm in the direction of the track width and a thickness (length) T2 of 5.0 μm. The lower pole piece P1 has a pole piece width W0 of 5.0 μm, a short side T11 of 1.0 to 1.5 μm and long side T12 of 4.0 to 4.5 μm. The upper pole piece P2 has a pole piece width W0 of 5.0 μm, a short side T21 of 1.0 to 1.5 μm and a long side T22 of 3.0 to 3.5 μm.

In an example in which both sides of the lower pole piece P1 and the upper pole piece P2 are removed in the direction of the width, the pole piece width W0 can be adjusted in conformance with the position of the removal at both ends in the direction of the width to easily realize the narrowing and the like required to support high-density recording.

Also, when there is a patterning error in the photolithography, the pole piece width can be set at a specific value with the selection and adjustment of the position of the removal at both ends in the direction of the width to improve the yield. Even when the required pole piece widths are different, patterning can be performed by using a single mask and the pole piece widths can then be set at specific values by adjusting the position and width of the removal. This eliminates the necessity for providing multiple masks to correspond to the widths of various pole pieces. One mask will suffice to form pole pieces, reducing the cost of production and, at the same time, improving the yield.

The removal at the sides of the lower pole piece and the upper pole piece in the direction of the width directly affects the write width due to the leakage flux, which is closely related to the depth d2 of the depressed areas created by the removal and the ratio (W0/W2) of the width W2 before removal at the upper pole piece in the direction of the track width to the width W0 after the removal in the direction of the track width.

Figure 11:
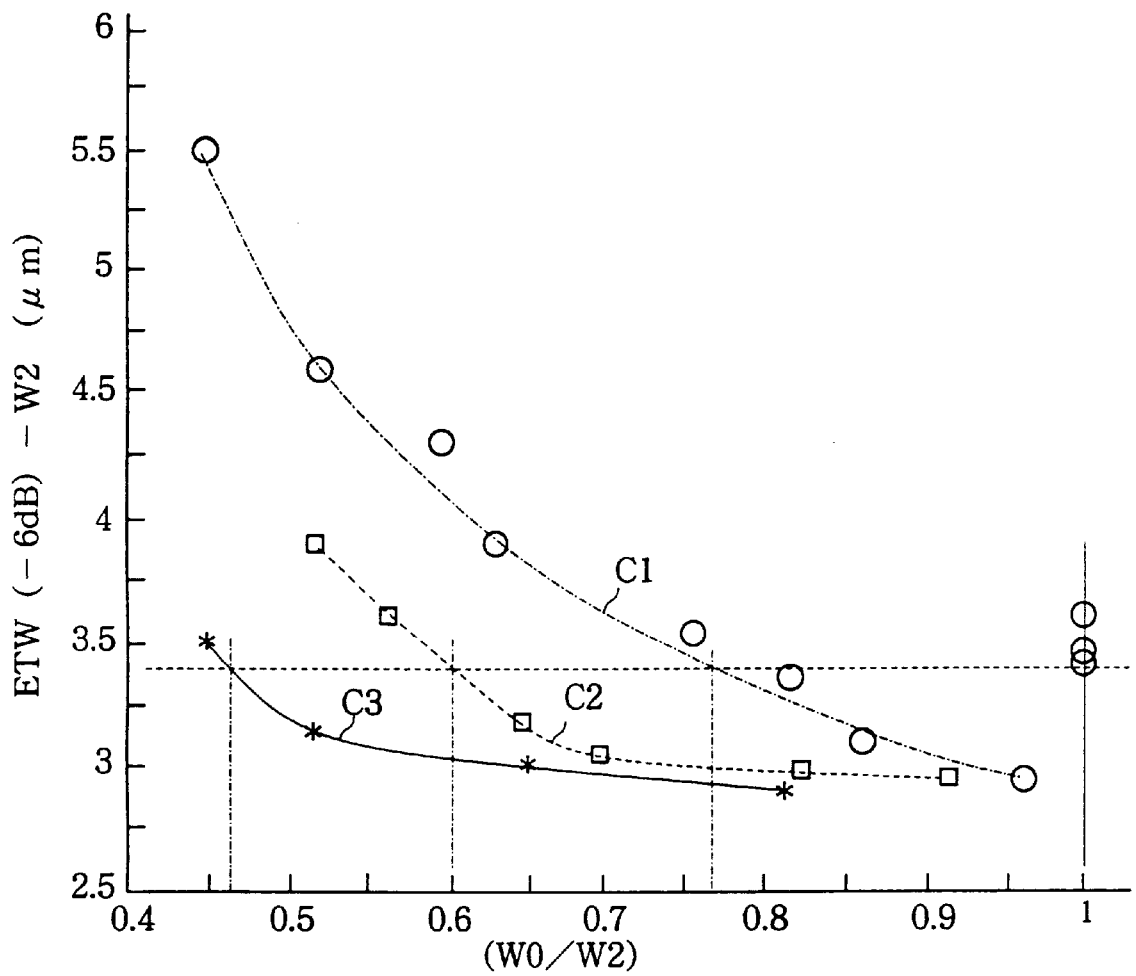
FIG. 11 is a graph of data showing the difference between the write width ETW (−6 dB) at the −6 dB drop-off point and the upper portion width W2 relative to the trim ratio (W0/W2) in the pole piece structure shown in FIG. 10.

FIG. 11 presents data that show the difference between the write width ETW (−6 dB) and the upper portion width W2 relative to the trim ratio (W0/W2) in the pole piece structure shown in FIG. 10.

Figure 12:
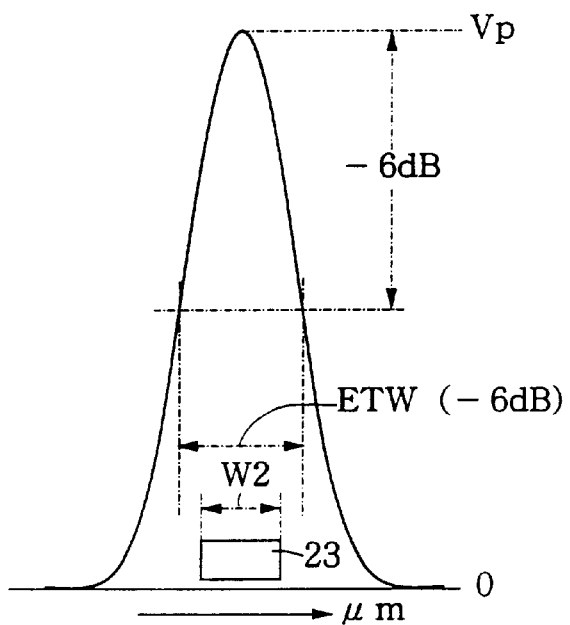
FIG. 12 illustrates the relationship between the write width ETW (−6 dB) and the upper portion width W2 shown in FIG. 11.

FIG. 12 illustrates the relationship between [ETW (−6 dB) −W2 ] and the upper portion width W2 shown in FIG. 11. The trim ratio (W0/W2) is taken for the horizontal axis and the difference between the write width ETW (–6 dB) and the upper pole piece width W2 is taken for the vertical axis. The trim ratio (W0/W2) is the ratio of the width W2 of the upper pole piece P2 before removal and its width W0 after removal (refer to FIG. 10). The write width ETW (–6 dB) on the vertical axis is the write width (μm) at the point that has dropped by –6 dB from the peak value VP of the write pulse in FIG. 12. The difference (μm) between the write width ETW (–6 dB) that is determined thus and the width W2 of the upper pole piece P2 is taken for the vertical axis in FIG. 11.

Generally speaking, as the difference (μm) between the write width ETW (–6 dB) and the width W2 of the upper pole piece P2 becomes larger, the write spread increases and as the difference becomes smaller, the write spread is reduced. This write spread is mainly caused by the leakage flux that occurs at the end of the upper pole piece P2 or the lower pole piece P1 in the direction of the width. Therefore, write spread can be controlled by controlling the spread of leakage flux in the direction of the width. The structure in which both sides of the lower pole piece P1 and the upper pole piece P2 are removed in the direction of the width, also provides a means for controlling the leakage flux from the ends of the pole pieces P2 and P1 in the direction of the width. In this instance, it is easily foreseen that the leakage flux is dependent upon the depth d2 of the depressed area and the width of the removal.

In FIG. 11, the curved line C1 indicates the characteristics when the depth d2 is 1 μm. The curved line C2 indicates the characteristics when the depth d2 is 2 μm and the curved line C3 indicates the characteristics when the depth d2 is 4 μm. In FIG. 11, the trim ratio (W0/W2) at 1 represents an example of the prior art in which the upper pole piece P2 has no removal in the direction of the width and this provides a basis for assessing the effect of the removal. With the trim ratio (W0/W2) at 1, the value of [ETW (–6 dB) –W2 ] is approximately 3.5 μm. Therefore, the write width due to the leakage flux can be reduced compared to the prior art within a range in which the value of [ETW (–6 dB) –W2 ] is smaller than 3.5 μm.

The data presented in FIG. 11 indicate that the range in which the value [ETW (–6 dB) –W2 ] is smaller than 3.5 μm is the range in which the trim ratio (W0/W2) is 0.8 or more when the depth d2 is 1 μm or more. When the depth d2 is 2 μm or more, this range corresponds to the range in which the trim ratio (W0/W2) is 0.6 or more. When the depth d2 is 4 μm or more, this range corresponds to the range in which the trim ratio (W0/W2) is 0.5 or more. By selecting such ranges, the write width due to the leakage flux can be reduced in comparison to the prior art.

Figure 13:
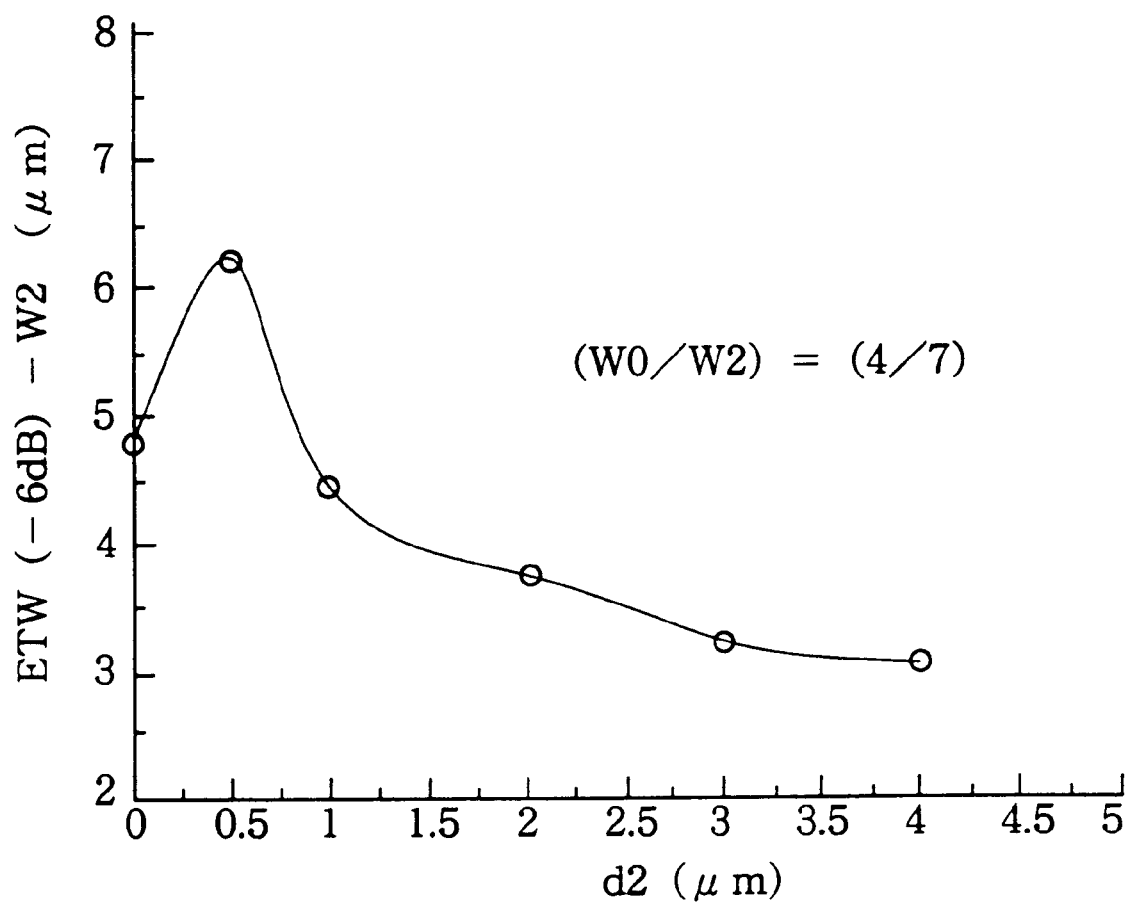
FIG. 13 illustrates the relationship between [ETW (−6 dB)−W2] and the depth d2 of the depressed areas.

FIG. 13 shows the relationship between the [ETW (–6 dB) –W2 ] value and the depth d2 of the depressed areas. In FIG. 13, the trim ratio (W0/W2) is set at (4/7). It is clear by studying the figure that when the depth d2 of the depressed area is 1 μm or less, the [ETW (–6 dB) –W2 ] value increases drastically. Therefore, when the trim ratio (W0/W2) is set at the values above, the depth d2 that does not increase the write width due to the leakage flux will be 1 μm or more.

Figure 14:
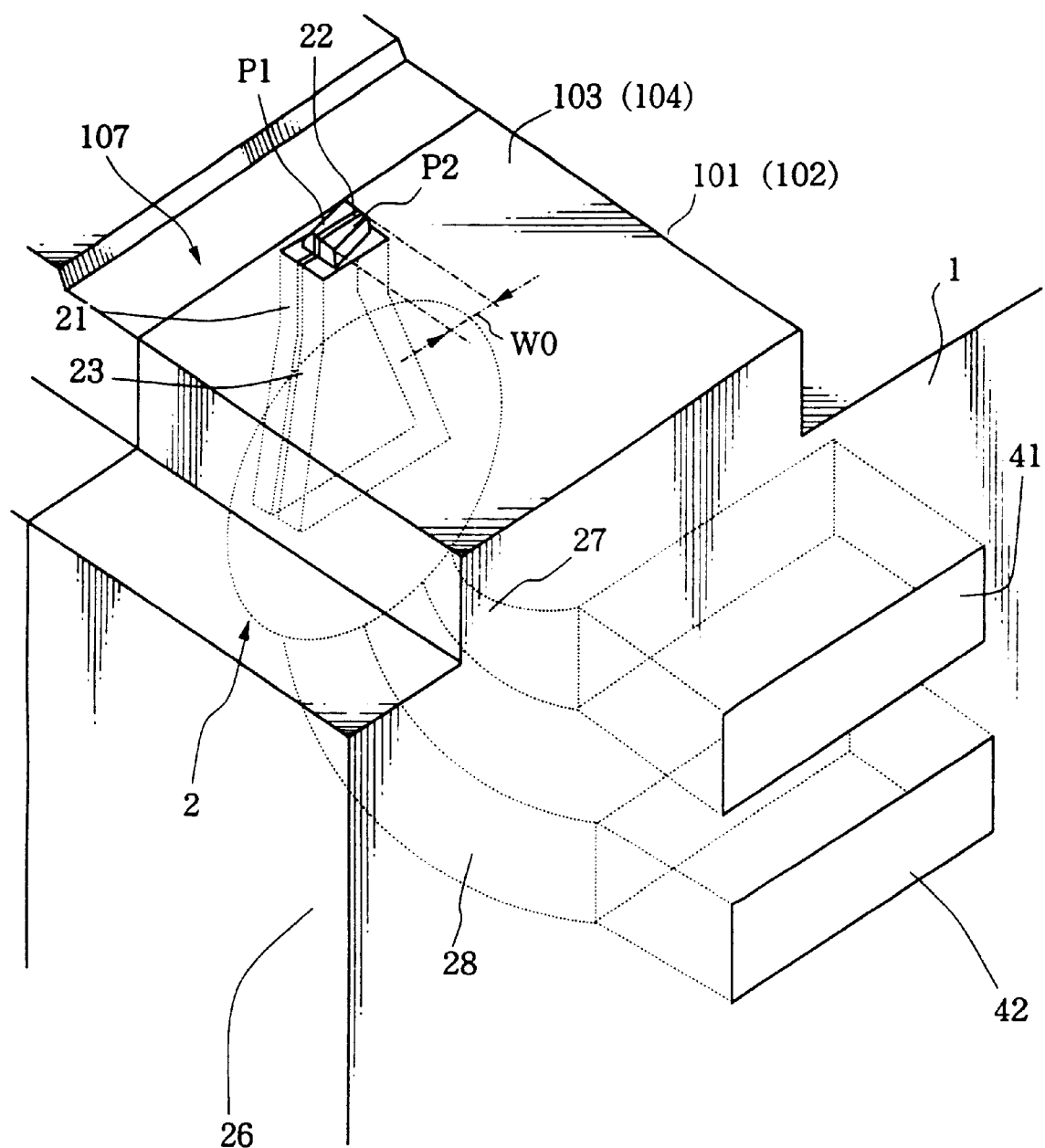
FIG. 14 is an enlarged perspective view of the magnetic transducer element in another embodiment of the thin film magnetic head according to the present invention.

FIG. 14 is a partial enlarged perspective view of yet another embodiment of the thin film magnetic head according to the present invention and the depressed area 107 has three sides open. With this structure, accumulation of various types of dust in the depressed areas 105 and 106 during read and write operations can be avoided.

Figure 15:
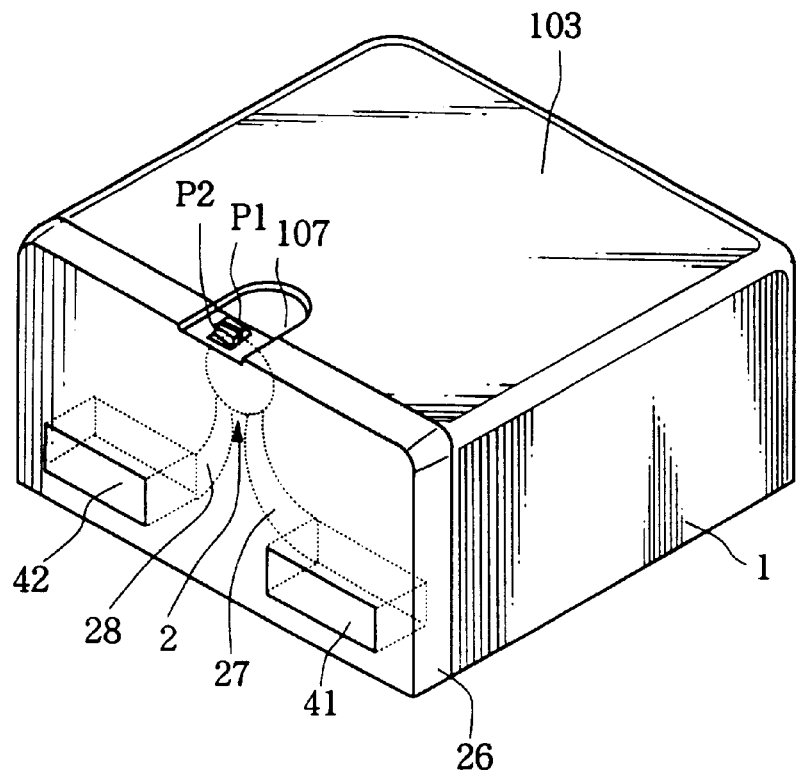
FIG. 15 is a perspective view showing another embodiment of the thin film magnetic head according to the present invention.

FIG. 15 is a perspective of yet another embodiment of the thin film magnetic head according to the present invention.

The slider 1 constitutes a flat air-bearing surface 103 in which the surface that faces opposite the medium does not have any rail portions. The thin film magnetic transducer element 2 is provided at the center of the slider 1 in the direction of the width.

Figure 16:
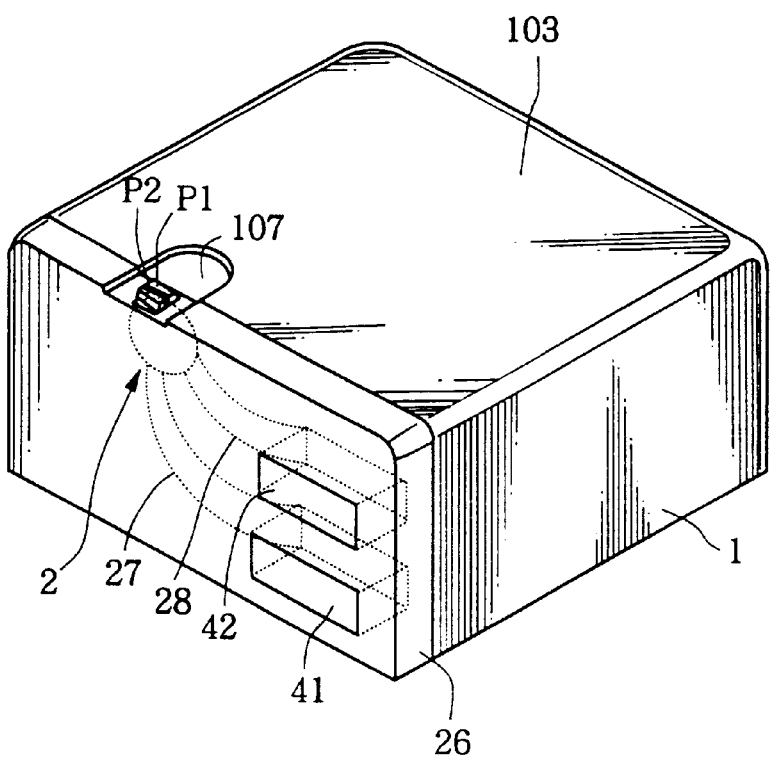
FIG. 16 is a perspective view showing yet another embodiment of the thin film magnetic head according to the present invention.

FIG. 16 is a perspective view of yet another embodiment of the thin film magnetic head according to the present invention. As in the embodiment shown in FIG. 15, the slider 1 constitutes a flat air-bearing surface 103 in which the surface that faces opposite the medium does not have any rail portions. The thin film magnetic transducer element 2 is provided toward one side of the slider 1 in the direction of the width.

Figure 17:
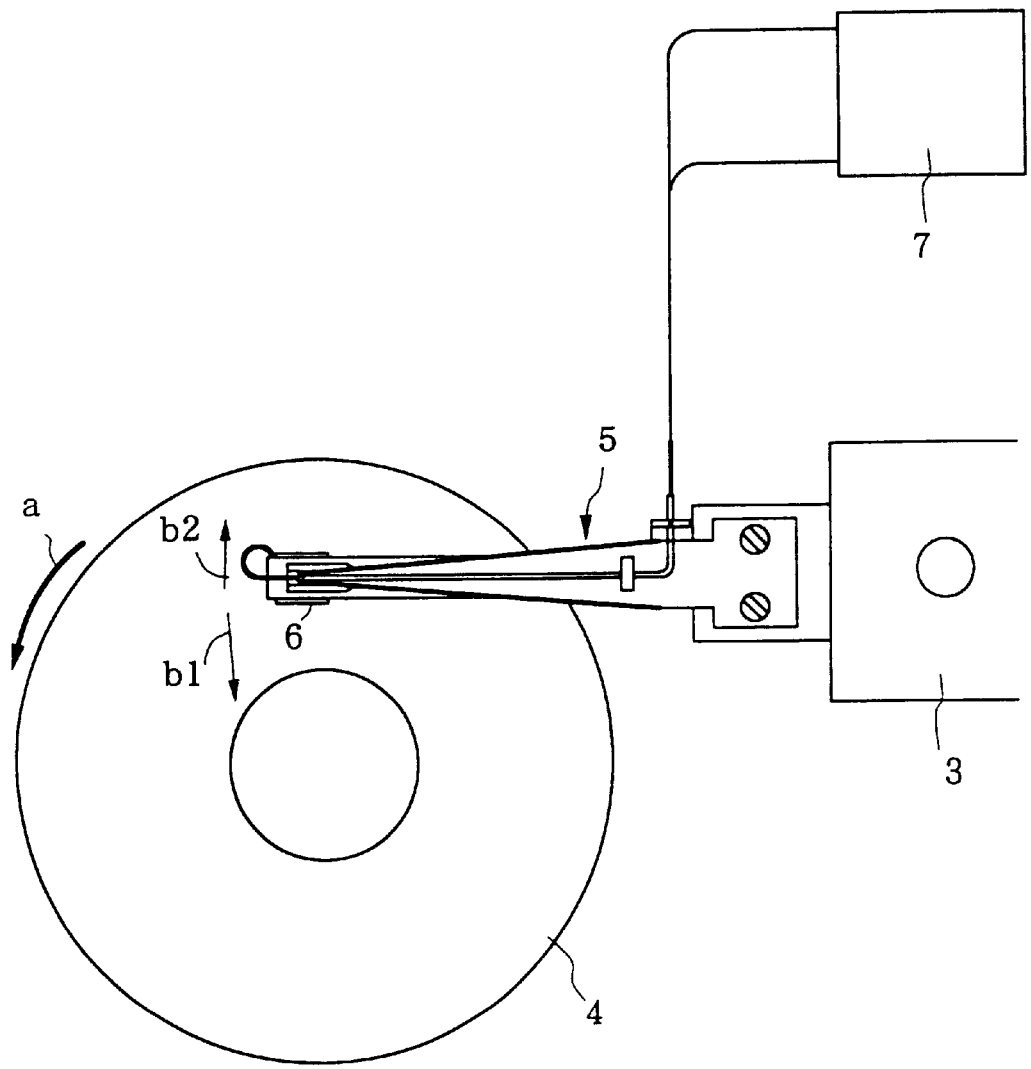
FIG. 17 is a plan view of the magnetic recording and reproducing apparatus according to the present invention.

FIG. 17 shows a magnetic recording and reproducing apparatus according to the present invention. This recording and reproducing apparatus includes a positioning device 3, a magnetic disk 4, a head support device 5 of the known art, a magnetic head 6 according to the present invention and a signal processing circuit 7. The magnetic disk 4 is rotated and driven in the direction indicated by the arrow a by a rotation drive mechanism (not shown in the figure). The positioning device 3 employs the rotary actuator system and it supports one end of the head support device 5 and it drives in the direction indicated with the arrow b1 or the arrow b2 at a specific angle on the surface of the magnetic disk 4. With this, write and read operations to and from the magnetic disk 4 are performed on a specific track. The magnetic disk 4 may be prepared by providing a magnetic recording layer on a substrate that has a high degree of surface smoothness of, for example, 100 Å or lower. As one example of such a substrate, a glass substrate can be cited.

During read/write operations, the head support device 5 that supports the magnetic head 6 is driven around a pivot at the center by the rotary actuator system positioning device 3 so as to swing it in the directions indicated with the arrows b1 and b2. The position of the magnetic head 6 on the magnetic disk 4 is normally indicated with a skew angle.

Figure 18:
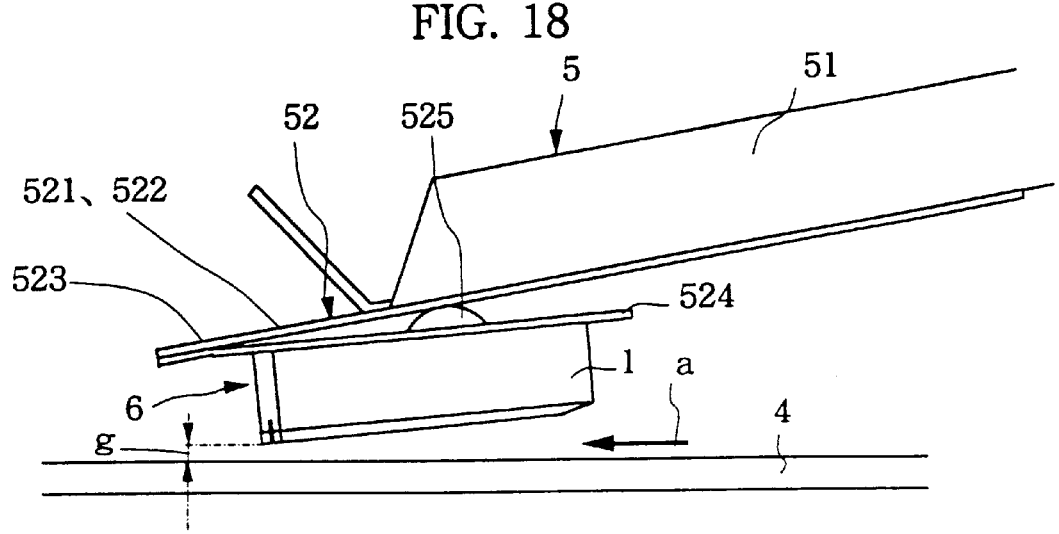
FIG. 18 is a side view of the magnetic head device that constitutes the magnetic recording and reproducing apparatus according to the present invention.

FIG. 18 is a side view of the magnetic head device. The head support device 5 has a structure in which a flexible body 52 that is formed from a thin metal plate is attached to the free end located at one end in the direction of the length of the support body 51 which is also formed of a thin metal plate. The magnetic head 6 is mounted on the lower surface of this flexible body 52. With this structure, a load force is applied to press the magnetic head 6 toward the magnetic disk 4. The flexible body 52 shown in the figure has a structure that includes two outer frame sections 521 and 522 that extend approximately parallel with the axis of the support body 51 in the direction of the length, the lateral frame 523 that links the outer frame sections 521 and 522 at the end that is away from the support body 51, and a tongue piece 524 that extends approximately parallel to the outer frames 521 and 522 from the approximate center of the lateral frame 523 and whose end is a free end. The end on the opposite side from the direction in which the lateral frame 523 is present, is attached in the vicinity of the free end of the support body 51 by means such as welding or the like.

A load-bearing protrusion 525 which may take the form of, for example, a hemispherical member provided on the upper surface of the tongue piece 524 of the flexible body 52 and with this load-bearing protrusion 525, the load force is communicated from the free end of the support body 51 to the tongue piece 524.

The magnetic head 6 is mounted on the lower surface of the tongue piece 524 by means such as bonding or the like.

The magnetic head 6 is mounted on the magnetic head support device 5 in such a manner that the direction of its length aligns with the direction of the length of the head support device 5. The head support device 5 that can be used in the present invention is not limited to that used in the embodiment described above. Various head support devices which have been disclosed and those that will be disclosed in the future can also be used.

The signal processing circuit 7 performs transmission/reception of signals with the thin film magnetic head 6. The signal processing circuit 7 may employ the peak detection method which is used in the prior art, but it is especially desirable to employ PRML that combines the regenerated waveform equalization processing based upon the partial response method and signal decoding processing based upon the Viterbi decoding algorithm.

With the thin film magnetic head according to the present invention, as described earlier, since the sub pulse becomes diffused on the time axis and the output waveform becomes a waveform similar to the Lorentz pulse, and since $\Delta P1 > \Delta P2$ is satisfied, the sub pulse generated at the lower pole piece and the sub pulse generated at the upper pole piece are controlled in the direction whereby they become equalized. This makes it possible to adopt the regenerated waveform equalization processing based upon the partial response method. Consequently, it is possible to achieve PRML that combines the above processing with the signal decoding processing based upon the Viterbi decoding algorithm. The PRML technology is disclosed in U.S. Pat. No. 4,571,734, U.S. Pat. No. 4,644,564 and U.S. Pat.No. 4,707,681. These prior art patents show that PRML improves the processing of intersymbol interference and that it facilitates highly efficient use of a specific channel bandwidth.

Generally speaking, the partial response method is a method for performing efficient data transfer by allowing intersymbol interference with the waveform on the reception side when transferring data digitally.

Intersymbol interference is not generated in a transfer path whose band is sufficiently wide to pass even the high frequency element of the pulse waveform. If the band width of the transfer path is narrow, the band can be expanded for the entire system by using an equalizer that emphasizes the high frequency element. With this, intersymbol interference can be reduced but at the same time, the high frequency noise element becomes increased. In the partial response method, the band is left unexpanded and intersymbol interference will naturally occur. However, the characteristics of the entire system are set in such a manner that this interference will be specific interference. Consequently, with partial response method, data can be transferred in a narrower frequency band without reducing the speed compared with data transfer performed without allowing intersymbol interference. In the read/write system for magnetic recording, if one regards the recording as transmission and the reproducing as reception, the entire system can be regarded as a type of data transfer path and the partial response method can be adopted.

In order to realize the partial response method in a magnetic read/write system, the characteristics of the waveform equalizer and the like are set in such a manner that the reproduced waveform will have specific intersymbol interference. The partial response method allows several variations depending upon what type of intersymbol interference is applied. These various sub methods are classified according to the impulse response in the read/write system and include PR1, PR4, EPR4 and EEPR4.

The impulse response for the PR1 method is expressed as PR 1, 1). The figures in parentheses indicate the figures when the waveform of the impulse response is sampled at specific time intervals T and PR(1, 1)indicates that the data at time t=0 gives a positive interference to other data at the next sampling time t=T. The impulse response for the PR4 method is expressed as PR(1, 0, −1), the impulse response for the EPR4 method is expressed as PR(1, 1,−1, −1) and the impulse response for the EEPR4 method is expressed as PR(1, 2, 0, −2, −1). Note that when the delay operator D is used, the impulse response for PRR1, that is, PRR(1, 1)is expressed as the characteristic of (1+D), the impulse response for PR4, that is, PR(1, 0, −1) is expressed as the characteristic of (1−D) (1+D), the impulse response for EPR4, that is, PR(1, 1, −1, −1) is expressed as the characteristic of (1−D) (1+D) 2 and the impulse response for EEPR4, that is, PR(1, 2, 0, −2, −1) is expressed as the characteristic of (1−D) (1+D)3. The various characteristics expressed thus are provided to the read/write system. Any one of these methods can be used in the present invention. However, it is especially desirable to use PR4, EPR4 or EEPR4, from the viewpoint of compatibility with the Viterbi decoding algorithm.

The 8–9 conversion code as well as the (1, 7) code that is used in existing magnetic recording and reproducing apparatuses can be used for recording and encoding in the partial response method employed in the present invention. With the (1, 7) code, a restriction is applied to runs of "0" appearing between "1" and "1" in data streams. In the (1, 7) code, the first figure within the parenthesis indicates the minimum value of the run and the second figure indicates the maximum value of the run. In other words, in the (1, 7) code, the "0" always follows the "1" and the "0" can occur in succession only to a maximum of 7 figures; there can never be 8 "0"s in a row. By imposing this limit, the density of the bits that can be recorded can be raised in comparison with the density of the magnetic inversions on the magnetic disk.

The (0, 4, 4) code is a variation of the 8–9 conversion code and in this, the run is 0 or more and 4 or fewer. The last figure "4" indicates that the maximum value of the run is 4 even when the data train is viewed alternately after encoding. This characteristic of the 8–9 conversion code is extremely effective when decoding waveform that has been equalized in conformance with PR4, using the Viterbi decoding algorithm.

In the magnetic recording and reproducing apparatus according to the present invention, the PRML is structured by combining the reproduced waveform equalization processing based upon the partial response method described above with the signal decoding processing based upon the Viterbi decoding algorithm. The Viterbi decoding algorithm is also referred to as the maximum likelihood decoding algorithm and is a decoding method in which the most likely data train is detected when data streams which have correlations among data are received. With this method, when the reproduced signal includes noise, errors can be reduced relatively. When there are correlations in the data, the reproduced waveform can only take certain limited patterns. Although the actual reproduced waveform that includes noise sometimes deviates from these patterns, by selecting the closest pattern, the data train that is most likely to be correct can be found, and consequently, an error at the time of data detection can be corrected. Since the equalized waveforms that use the partial response method have correlations among data caused by intersymbol interference, it is possible to apply the Viterbi decoding algorithm.

As explained above, the thin film magnetic head according to the present invention is extremely suitable for combining the regenerated waveform equalization processing based upon the partial response method with the signal decoding processing circuit that uses the Viterbi decoding algorithm, which makes it possible to perform high-density recording, improving the recording density by 20 to 50%.

While the invention has been particularly shown and described with reference to a preferred embodiment, thereof, it will be understood by those skilled in the art that various changes in form and detail may be made therein without departing from the spirit, scope and teaching of the invention.

What is claimed is:

1. A magnetic recording and reproducing apparatus that includes a thin film magnetic head and a signal processing circuit, wherein:

said thin film magnetic head is provided with a slider and a thin film magnetic transducer element;

said slider is constituted of non-magnetic material and is provided with an air bearing surface on a side that faces opposite a recording medium;

said thin film magnetic transducer element is provided with a thin film magnetic circuit that includes a lower magnetic film, an upper magnetic film and a coil film, and is positioned on said slider, and is covered with a protective film formed of insulating material;

said lower magnetic film and said upper magnetic film have a lower pole piece and an upper pole piece respectively that face opposite each other across a gap film with front end surfaces of said lower pole piece and said upper pole piece emerging on said air bearing surface;

said lower pole piece is provided with a first depressed area and said upper pole piece is provided with a second depressed area and said first and second depressed areas are formed by partially removing said front end surfaces along with surfaces of said slider and said protective film on opposite sides of said gap film such that end edges formed at a boundary with said front end surfaces are non-parallel to said gap film;

when a maximum pole length of the front end surface from the gap film to the first depressed area at a first edge of the lower pole piece and a minimum pole length of the front end surface from the gap film to the first depressed area at a second edge opposite the first edge of the lower pole piece are P1max and P1min respectively, and a difference between the maximum pole length P1max and the minimum pole length P1min is $\Delta P1$, and when a maximum pole length of the front end surface from the gap film to the second depressed area at a first edge of the upper pole piece and a minimum pole length of the front end surface from the gap film to the second depressed area at a second edge opposite the first edge of the upper pole piece are P2max and P2min respectively, and a difference between the maximum pole length P2max and the minimum pole length P2min is $\Delta P2$, a condition $\Delta P1 > \Delta P2$ is satisfied; and said signal processing circuit performs signal reception and transmission with said thin film magnetic head.

2. The magnetic recording and reproducing apparatus of claim 1, wherein:

said difference $\Delta P1$ is 1.5 times greater than said difference $\Delta P2$.

3. The magnetic recording and reproducing apparatus of claim 1, wherein:

said difference $\Delta P1$ and said difference $\Delta P2$ are at least twice as great as a shortest magnetizing inversion wavelength.

4. The magnetic recording and reproducing apparatus of claim 1, wherein:

said difference $\Delta P1$ and said difference $\Delta P2$ are at least four times as great as a shortest magnetizing inversion wavelength.

5. The magnetic recording reproducing apparatus of claim 1, wherein:

a depth of said depressed areas is within a range of 0.05 to 5 $\mu$m.

6. The magnetic recording and reproducing apparatus of claim 1, wherein:

said end edges of said depressed areas provided at said lower pole piece and said upper pole piece are inclined in a same direction.

7. The magnetic recording and reproducing apparatus of claim 1, wherein:

said signal processing circuit employs a peak detection method.

8. The magnetic recording and reproducing apparatus of claim 1, wherein:

said signal processing circuit includes regenerated waveform equalization processing based upon a partial response method and signal decoding processing based upon a Viterbi decoding algorithm.

9. The magnetic recording and reproducing apparatus of claim 8, wherein:

said partial response method is any one of PR4, EPR4 or EEPR4.

10. The magnetic recording and reproducing apparatus of claim 8, wherein:

said signal processing circuit employs a (1, 7) code.

11. The magnetic recording and reproducing apparatus of claim 8, wherein:

said signal processing circuit employs an 8–9 conversion code.

12. A magnetic recording and reproducing apparatus that includes a thin film magnetic head and a signal processing circuit, wherein:

said thin film magnetic head is provided with a slider and a thin film magnetic transducer element;

said slider is constituted of non-magnetic material and is provided with an air bearing surface on a side that faces opposite a medium;

said thin film magnetic transducer element is provided with a thin film magnetic circuit that includes a lower magnetic film, an upper magnetic film, and a coil film and is positioned on said slider, and is covered with a protective film formed of insulating material;

said lower magnetic film and said upper magnetic film have a lower pole piece and an upper pole piece respectively that face opposite each other across a gap film with front end surfaces of said lower pole piece and said upper pole piece emerging on said air bearing surface;

said lower pole piece has a first removal and said upper pole piece has a second removal respectively at two sides in a direction of track width, said first and second removals being extended to a surface of said slider or said protective film;

when a maximum pole length of the front end surface from the gap film to the first removal at a first edge of the lower pole piece and a minimum pole length of the front end surface from the gap film to the first removal of a second edge opposite the first edge of the lower pole piece are P1max and P1min respectively, and a difference between the maximum pole length P1max and the minimum pole length P1min is ΔP1, and when a maximum pole length of the front end surface from the gap film to the second removal at a first edge of the upper pole piece and a minimum pole length of the front end surface from the gap film to the second removal at a second edge opposite the first edge of the upper pole piece are P2max and P2min respectively, and a difference between the maximum pole length P2max and the minimum pole length P2min is ΔP2, a condition ΔP1>ΔP2 is satisfied; and said signal processing circuit performs signal reception and transmission with said thin film magnetic head.

13. The magnetic recording and reproducing apparatus of claim 12, wherein:

when a depth d2 of a depressed area created by said second removal is at least 1 μm, a width of said upper pole piece in a direction of track width before said second removal is W2, and a width in the direction of track width after said second removal is W0, a ratio (W0/W2) is at least 0.8.

14. The magnetic recording and reproducing apparatus of claim 12, wherein:

when a depth d2 of a depressed area created by said second removal is at least 2 μm, a width of said upper pole piece in a direction of track width before said second removal is W2, and a width in the direction of track width after said second removal is W0, a ratio (W0/W2) is at least 0.6.

15. The magnetic recording and reproducing apparatus of claim 12, wherein:

when a depth d2 of a depressed area created by said second removal is at least 4 μm, a width of said upper pole piece in a direction of track width before said second removal is W2, and a width in the direction of track width after said second removal is W0, a ratio (W0/W2) is at least 0.5.

16. The magnetic recording and reproducing apparatus of claim 12, wherein:

said signal processing circuit employs a peak detection method.

17. The magnetic recording and reproducing apparatus of claim 12, wherein:

said signal processing circuit includes regenerated waveform equalization processing based upon a partial response method and signal decoding processing based upon a Viterbi decoding algorithm.

18. The magnetic recording and reproducing apparatus of claim 17 wherein:

said partial response method is any one of PR4, EPR4 or EEPR4.

19. The magnetic recording and reproducing apparatus of claim 17, wherein:

said signal processing circuit employs a (1, 7) code.

20. The magnetic recording and reproducing apparatus of claim 17, wherein:

said signal processing circuit employs an 8–9 conversion code.

* * * * *